United States Patent
Brumitt et al.

(10) Patent No.: US 6,798,445 B1
(45) Date of Patent: Sep. 28, 2004

(54) SYSTEM AND METHOD FOR OPTICALLY COMMUNICATING INFORMATION BETWEEN A DISPLAY AND A CAMERA

(75) Inventors: Barrett L. Brumitt, Redmond, WA (US); Steven A. N. Shafer, Seattle, WA (US); Stephen C. Harris, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 855 days.

(21) Appl. No.: 09/658,396

(22) Filed: Sep. 8, 2000

(51) Int. Cl.[7] .................. H04N 5/225; H04N 5/232; H04N 5/44
(52) U.S. Cl. .................. 348/207.11; 348/211.99; 348/211.1; 348/211.2; 348/211.8; 348/734
(58) Field of Search ............. 348/207.11, 211.99, 348/211.1, 211.2, 211.8, 734

(56) References Cited

U.S. PATENT DOCUMENTS

| | | | | |
|---|---|---|---|---|
| 4,527,096 A | | 7/1985 | Kindlmann | 315/169.3 |
| 5,488,571 A | | 1/1996 | Jacobs et al. | 364/705.07 |
| 5,535,147 A | * | 7/1996 | Jacobs et al. | 708/111 |
| 5,617,235 A | * | 4/1997 | Abrahamson | 398/130 |
| 5,793,880 A | * | 8/1998 | Constant | 382/100 |
| 5,835,388 A | * | 11/1998 | Helm | 708/111 |
| 5,850,304 A | * | 12/1998 | Elmers et al. | 398/107 |
| 5,852,615 A | * | 12/1998 | Holo et al. | 714/712 |
| 6,281,820 B1 | * | 8/2001 | Fields | 341/137 |
| 6,677,990 B1 | * | 1/2004 | Kawahara | 348/211.13 |

* cited by examiner

Primary Examiner—Wendy R. Garber
Assistant Examiner—James M. Hannett
(74) Attorney, Agent, or Firm—Lyon & Harr, L.L.P.; Craig S. Fischer

(57) ABSTRACT

A system and a method for optically communicating information between a display and a camera that is observing the display. In general, the transmission of information is unidirectional in a direction from the display to the camera. The display transmits information to the camera that is observing the display by displaying a series of symbols and images (such as an alphabet) on the display. Information (such as a network address of the display or camera) may be transmitted to the camera without any prior shared knowledge between the two. The present invention also is capable of determining a spatial location (or pose) of the display (relative to a camera observing the display) by observing a pattern presented on the display and using well-known correlation techniques.

7 Claims, 12 Drawing Sheets

SYSTEM AND METHOD FOR OPTICALLY COMMUNICATING INFORMATION BETWEEN A DISPLAY AND A CAMERA

BACKGROUND OF THE INVENTION

1. Field of the Invention

The present invention relates in general to an optical communication of information and more particularly to a system and a method for optically communicating information between a display and a camera that is observing the display.

2. Related Art

Optical communication between an image source (such as a display) and an image detector (such as a camera) is desirable and has several applications. By way of example, if a computer network contains several devices and sensors within a large physical space, the addition of a new device (such as a display or a camera) could be greatly simplified if the display and the camera were in optical communication. The display and camera would simply establish an optical communication link and transmit information (such as a network address). In this manner a new device could be connected to the computer network automatically and without human intervention.

Unfortunately, there are few techniques currently available that permit optical communication between a display and a camera. There are some techniques, however, that allow optical communication between other types of devices. For example, one technique facilitates data transmission between a display and a watch having a photosensor. This technique permits data to be downloaded from the computer (via the display) to the watch memory. One disadvantage, however, of this technique is that a large degree of human intervention is required to facilitate the download. In particular, the user must hold the watch up to the display for the duration of the download, which can be tiring for the user and lead to inaccurate and incomplete data transmission. In addition, this technique and others have the disadvantage of not being able to automatically determine the spatial location (or pose) of the display relative to the camera observing the display. Knowledge of the display pose is important because when the pose is known the system is able to include the display and camera in any physically-based user interface. For example, if the system wants to send a user a visual message, it is necessary to select a display that the user can actually see. If the cameras (or appropriate hardware) are used to track the location of the user, then the physical relationship between user and camera can be determined. By repeating this process for all displays, it is possible to select the display that is in the most advantageous location for interacting with the user.

Accordingly, there exists a need for a system and method for optically communicating information between a display and a camera that is automatic and does not require any human intervention. This system and method would allow a variety of information to be transmitted between the display and camera to facilitate, for example, automatic connection of a new device to a computer network. In addition, this system and method for optically communicating information would enable a pose of the display to be determined relative to the camera. Whatever the merits of the above-mentioned systems and methods, they do not achieve the benefits of the present invention.

SUMMARY OF THE INVENTION

To overcome the limitations in the prior art as described above and other limitations that will become apparent upon reading and understanding the present specification, the present invention includes a system and a method for optically communicating information between a display and a camera that is observing the display. In general, the transmission of information is unidirectional in a direction from the display to the camera. The display of the present invention includes any device (such as a cathode ray tube (CRT) monitor) capable of transmitting information via communication symbols (such as characters, patterns, images, etc.). The display transmits information to the camera that is observing the display by using the communication symbols and displaying the symbols on the display. Information (such as a network address) may be transmitted to the camera without any prior shared knowledge between the display or the camera. Using either a stereo camera or a monocular camera, the present invention also is capable of determining a spatial location of the display (relative to a camera observing the display) by observing a pattern presented on the display and using well-known correlation techniques.

In general, the method of the present invention includes locating a display ready to communicate information, using the display to communicate communication symbols to a camera that is observing the display in order to "teach" the camera, and transmitting information from the display to the camera using the communication symbols. In addition, a preferred embodiment includes having the display notify the camera that the display is ready to transmit information by displaying a prominent pattern. This informs the camera that a certain display will begin transmitting information. Next, the communication symbols between the display and the camera are defined by having the display present each of the communication symbols to the camera. This presentation of the communication symbols is done in sequence, such that the camera assigns a definition to each of the communication symbols. The display then optically transmits the information using the communication symbols and the previously-obtained definition of the communication symbols is used by the camera to decode the information sent by the display. In this manner the display can optically transmit any type of information to the camera. In addition, the display can display a localization pattern such that the camera can determine the spatial location of the display relative to the camera.

Moreover, the present invention also includes stabilizing video images of the display in the event that the display is a cathode ray tube (CRT) design. More specifically, the present invention includes an aggregation technique that obtains a series of camera images and produces a stabilized aggregated image to minimize flicker caused by the display being refreshed. In addition, the present invention includes a method for using either a stereo camera or a monocular camera to determine a pose of the display (relative to the cameras). In a preferred embodiment, the technique uses a stereo camera to measure pose and includes using a random localization pattern displayed on the screen to be observed by the stereo camera in order to maximize the probability of a strong correlation for each pixel. In an alternate embodiment, a monocular camera is used to measure pose by determining camera calibration parameters, detecting three or more points on the display, determining the relative positions on a plane of these points in physical (or real) units and computing the display pose relative to the camera using correlation techniques well-known to those of ordinary skill in the art. The present invention also includes a system for optically communicating information between a display and a camera using the above-described method.

Other aspects and advantages of the present invention as well as a more complete understanding thereof will become apparent from the following detailed description, taken in conjunction with the accompanying drawings, illustrating by way of example the principles of the invention. Moreover, it is intended that the scope of the invention be limited by the claims and not by the preceding summary or the following detailed description.

BRIEF DESCRIPTION OF THE DRAWINGS

The present invention can be further understood by reference to the following description and attached drawings that illustrate the preferred embodiments. Other features and advantages will be apparent from the following detailed description of the invention, taken in conjunction with the accompanying drawings, which illustrate, by way of example, the principles of the present invention.

Referring now to the drawings in which like reference numbers represent corresponding parts throughout.

DETAILED DESCRIPTION OF THE INVENTION

In the following description of the invention, reference is made to the accompanying drawings, which form a part thereof, and in which is shown by way of illustration a specific example whereby the invention may be practiced. It is to be understood that other embodiments may be utilized and structural changes may be made without departing from the scope of the present invention.

I. Exemplary Operating Environment

Figure 1:
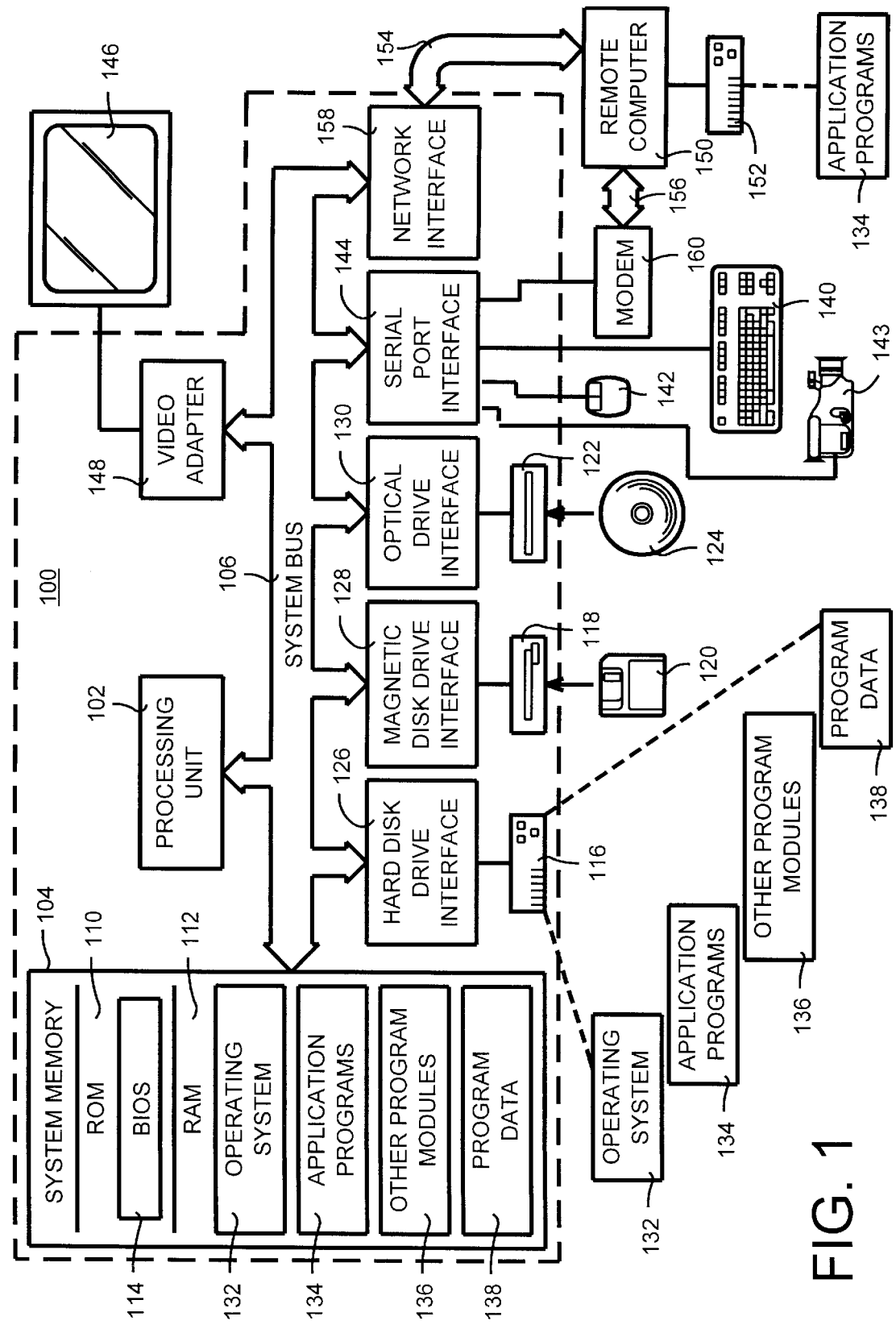
FIG. 1 is a block diagram illustrating an apparatus for carrying out the present invention.

FIG. 1 and the following discussion are intended to provide a brief, general description of a suitable computing environment in which the optical communication system and method of the present invention may be implemented. Although not required, the invention will be described in the general context of computer-executable instructions (such as program modules) being executed by a computer. Generally, program modules include routines, programs, objects, components, data structures, etc. that perform particular tasks or implement particular abstract data types. Moreover, those skilled in the art will appreciate that the invention may be practiced with a variety of computer system configurations, including personal computers, server computers, hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located on both local and remote computer storage media including memory storage devices.

With reference to FIG. 1, an exemplary system for implementing the invention includes a general-purpose computing device in the form of a conventional personal computer 100, including a processing unit 102, a system memory 104, and a system bus 106 that couples various system components including the system memory 104 to the processing unit 102. The system bus 106 may be any of several types of bus structures including a memory bus or memory controller, a peripheral bus, and a local bus using any of a variety of bus architectures. The system memory includes read only memory (ROM) 110 and random access memory (RAM) 112. A basic input/output system (BIOS) 114, containing the basic routines that help to transfer information between elements within the personal computer 100, such as during start-up, is stored in ROM 110. The personal computer 100 further includes a hard disk drive 116 for reading from and writing to a hard disk (not shown), a magnetic disk drive 118 for reading from or writing to a removable magnetic disk 120, and an optical disk drive 122 for reading from or writing to a removable optical disk 124 (such as a CD-ROM or other optical media). The hard disk drive 116, magnetic disk drive 118 and optical disk drive 122 are connected to the system bus 106 by a hard disk drive interface 126, a magnetic disk drive interface 128 and an optical disk drive interface 130, respectively. The drives and their associated computer-readable media provide nonvolatile storage of computer readable instructions, data structures, program modules and other data for the personal computer 100.

Although the exemplary environment described herein employs a hard disk, a removable magnetic disk 120 and a removable optical disk 124, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs), and the like, may also be used in the exemplary operating environment.

A number of program modules may be stored on the hard disk, magnetic disk 120, optical disk 124, ROM 110 or RAM 112, including an operating system 132, one or more application programs 134, other program modules 136 and program data 138. A user (not shown) may enter commands and information into the personal computer 100 through input devices such as a keyboard 140 and a pointing device 142. In addition, a camera 143 (or other types of imaging devices) may be connected to the personal computer 100 as well as other input devices (not shown) including, for example, a microphone, joystick, game pad, satellite dish, scanner, or the like. These other input devices are often connected to the processing unit 102 through a serial port interface 144 that is coupled to the system bus 106, but may be connected by other interfaces, such as a parallel port, a game port or a universal serial bus (USB). A monitor 146 or other type of display device is also connected to the system bus 106 via an interface, such as a video adapter 148. In addition to the monitor 146, personal computers typically include other peripheral output devices (not shown), such as speakers and printers.

The personal computer 100 may operate in a networked environment using logical connections to one or more remote computers, such as a remote computer 150. The remote computer 150 may be another personal computer, a server, a router, a network PC, a peer device or other common network node, and typically includes many or all of the elements described above relative to the personal computer 100, although only a memory storage device 152 has been illustrated in FIG. 1. The logical connections depicted in FIG. 1 include a local area network (LAN) 154 and a wide area network (WAN) 156. Such networking environments are commonplace in offices, enterprise-wide computer networks, intranets and the Internet.

When used in a LAN networking environment, the personal computer 100 is connected to the local network 154 through a network interface or adapter 158. When used in a WAN networking environment, the personal computer 100 typically includes a modem 160 or other means for establishing communications over the wide area network 156, such as the Internet. The modem 160, which may be internal or external, is connected to the system bus 106 via the serial port interface 144. In a networked environment, program modules depicted relative to the personal computer 100, or portions thereof, may be stored in the remote memory storage device 152. It will be appreciated that the network connections shown are exemplary and other means of establishing a communications link between the computers may be used.

II. Introduction

The system and method of the present invention facilitate optical communication between an image source (such as a display) and an image detector (such as a camera), whereby the camera is watching the display. Using communication symbols (such as characters, patterns, images, etc.), the present invention enables the display to unidirectionally transmit information to the camera. This information may include, for example, a network address. By way of example, the addition of a device (such as a display or camera) to a computer network is greatly simplified if the display and the camera are in optical communication. Thus, instead of requiring a user to manually determine and enter a network address of the device to be installed, any available camera can wait for a display equipped with the present invention to transmit an attention signal, define communication symbols and then transmit the information (such as the network address of the device) using the communication symbols. Once the device is found on the network it is possible for the user or other devices on the network to interact with the device. In addition, the present invention permits the spatial location (or pose) of a display to be determined relative to the observing camera. Display pose may be determined using a stereo camera or a monocular camera. In a preferred embodiment, a stereo camera is used and in general the display transmits a localization pattern containing random patterns and determines a depth of each pixel using a correlation technique. A plane is computed so that the display lies within the plane at a certain spatial location. In an alternate embodiment, a calibrated monocular camera is used and three or more points on the display and their relative position on a plane defining the display are determined.

III. General Overview

As shown in FIGS. 2–11 for purposes of illustration, the invention is embodied in a system and a method for unidirectionally communicating information between a display and a camera observing that display. In addition, the present invention includes a technique for determining a spatial location (or pose) of the display relative to the camera. The present invention allows a display to communicate information to a camera without the display or camera having any prior shared knowledge of each other.

Figure 2A:
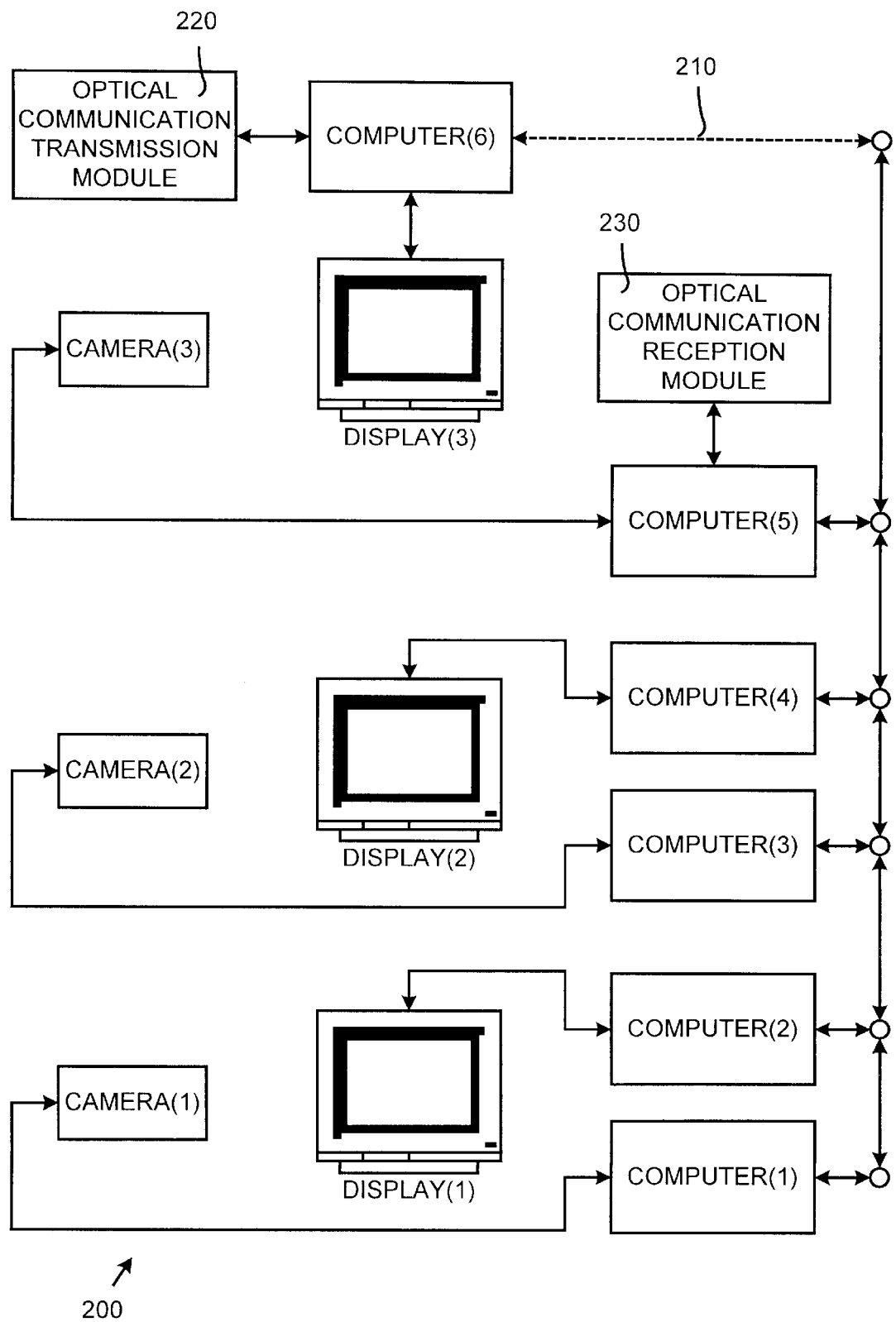
FIG. 2A is an overall block diagram illustrating a first implementation of the present invention and is shown for illustrative purposes only.
Figure 2B:
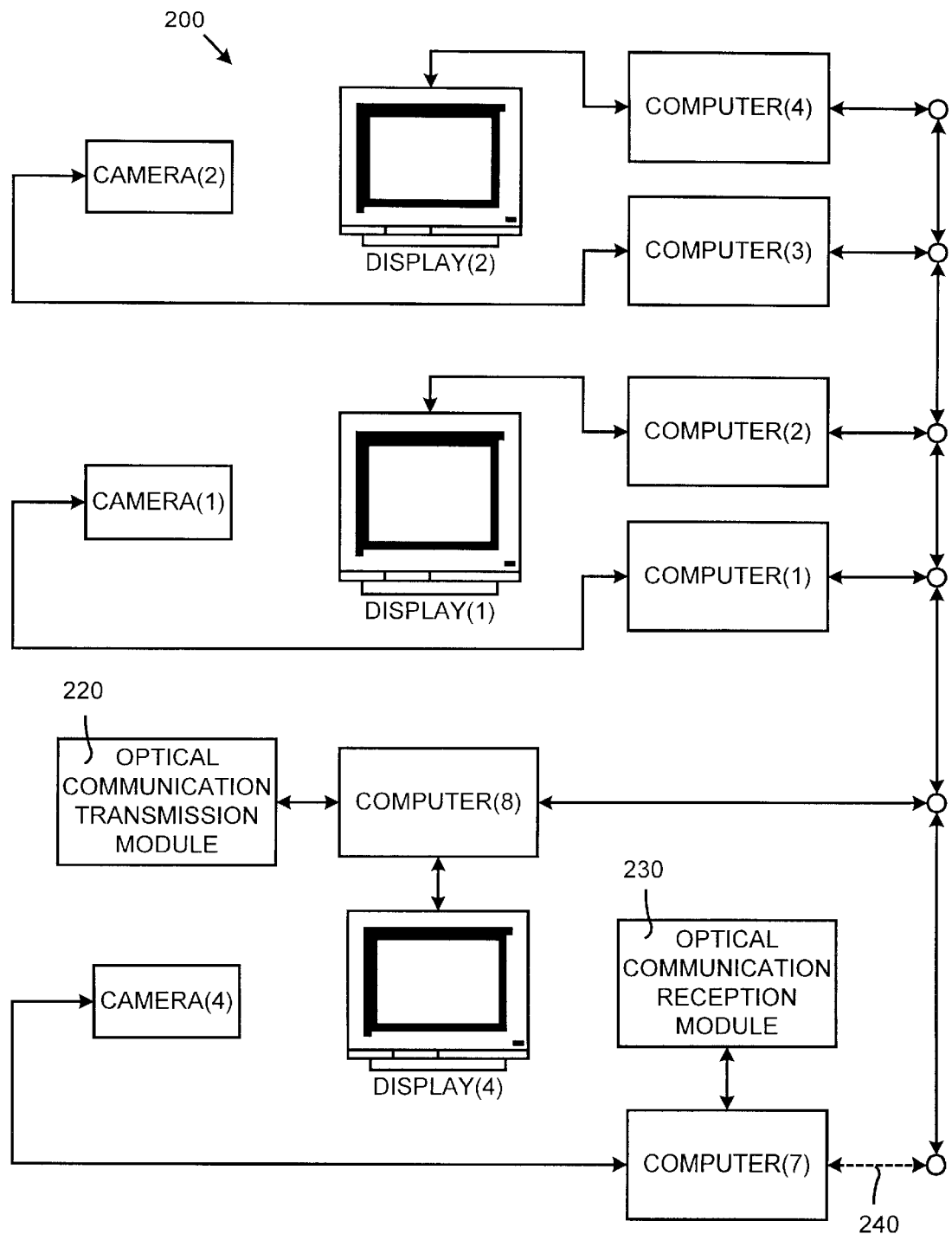
FIG. 2B is an overall block diagram illustrating a second implementation of the present invention and is shown for illustrative purposes only.

FIGS. 2A and 2B illustrate two situations in which the present invention may be used. Generally, FIGS. 2A and 2B illustrate a computer network 200 having a plurality of computers (such as the personal computer 100 discussed above) in a network configuration including cameras and displays. As explained in detail below, the present invention may be used to transmit information (such as a network address of a camera or a display) so that a camera of a display having no knowledge of the computer network 200 (and vice versa) may be connected to the computer network 200. It should be noted that the system shown in FIGS. 2A and 2B depicts only one of several types of systems that may incorporate the present invention.

FIG. 2A is an overall block diagram illustrating a first implementation of the present invention and is shown for illustrative purposes only. In general, FIG. 2A illustrates a situation whereby the present invention is used to automatically (and generally without human intervention) connect a new display to the computer network 200. Specifically, the computer network 200 includes computer(1), computer(2), computer(3), computer(4) and computer(5) connected to each other to form a network. Camera(1) is connected to computer(1), camera(2) is connected to computer(3) and camera(3) is connected to computer(5) while display(1) is connected to computer(2) and display(2) is connected to computer(4). These connected computers, displays and cameras are capable of communication with each other and each has a shared knowledge the other.

Computer(6) is not connected initially to the computer network 200 (as shown by the dashed line 210 between computer(5) and computer(6)). In other words, computer(6), which is connected to display(3), has no knowledge of the computer network 200 and vice versa. The present invention includes an optical communication transmission module 220, residing on computer(6), and an optical communication reception module 230, residing on computer(5). The optical communication transmission module 220 controls the transmission of information from display(3) to camera(3). Similarly, the optical communication reception module 230 controls the reception and processing of information received from display(3). As explained in detail below, the present invention provides a means for display(3) to connect to and become part of the computer network 200 by instructing display(3) to optically communicate information (such as a network address) to camera(3).

FIG. 2B is an overall block diagram illustrating a second implementation of the present invention and is shown for illustrative purposes only. In general, FIG. 2BA illustrates a situation whereby the present invention is used to automatically (and generally without human intervention) connect a new camera to the computer network 200. Specifically, the computer network 200 is similar to FIG. 2A and includes computer(8) connected to the computer network 200 with display(4) connected to computer(8).

Computer(7) is not connected initially to the computer network 200 (as shown by the dashed line 240 between computer(7) and computer(8)). Computer(8), which is connected to camera(4), has no knowledge of the computer network 200 and vice versa. In FIG. 2B, the present invention includes the optical communication transmission module 220 resident on computer(8) and the optical communication reception module 230 resident on computer(7). Similar to the implementation of FIG. 2A, the optical communication transmission module 220 controls the transmission of information from display(4) to camera(4) so that information (such as a network address of display(8) is optically transmitted to camera(7) to allow camera(7) to connect to and become part of the computer network 200.

IV. Components of the Invention

In general, the present invention optically communicates information between an image source and an image detector by notifying the image detector of an intent to transmit, defining communication symbols and transmitting information using the symbols. Optionally, the present invention includes a system and method for stabilizing the image sequence obtained by the image detector. Another optional system and method of the present invention includes using the optical communication between the image source and the image detector to determine a relative pose of the image source. In other words, by having the image source display a certain localization pattern the image detector can determine the spatial location of the image source.

Figure 3:
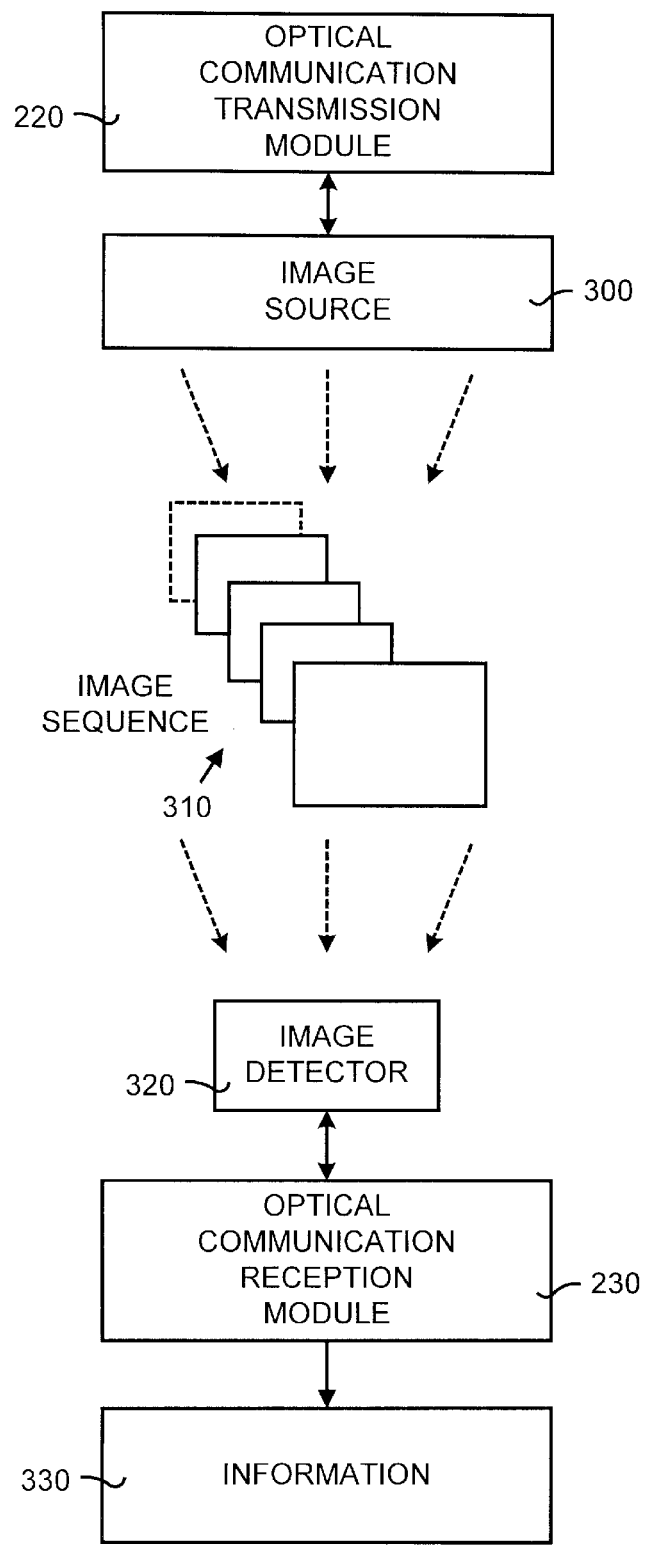
FIG. 3 is a general block diagram illustrating system and a method for optically communicating information between a display and a camera in accordance with the present invention.

FIG. 3 is a general block diagram illustrating system and a method for optically communicating information between a display and a camera in accordance with the present invention. In particular, the optical communication transmission module 220 is connected to an image source 300 (such as a display). The image source 300 transmits an image sequence 310 (such as communication symbols) to an image detector 320 (such as a camera) as instructed by the optical communication transmission module 220. The optical communication reception module 230, which is connected to the image detector 320, controls the reception of the transmitted information by the image detector 320 and in the interpretation of the transmitted information.

Figure 4:
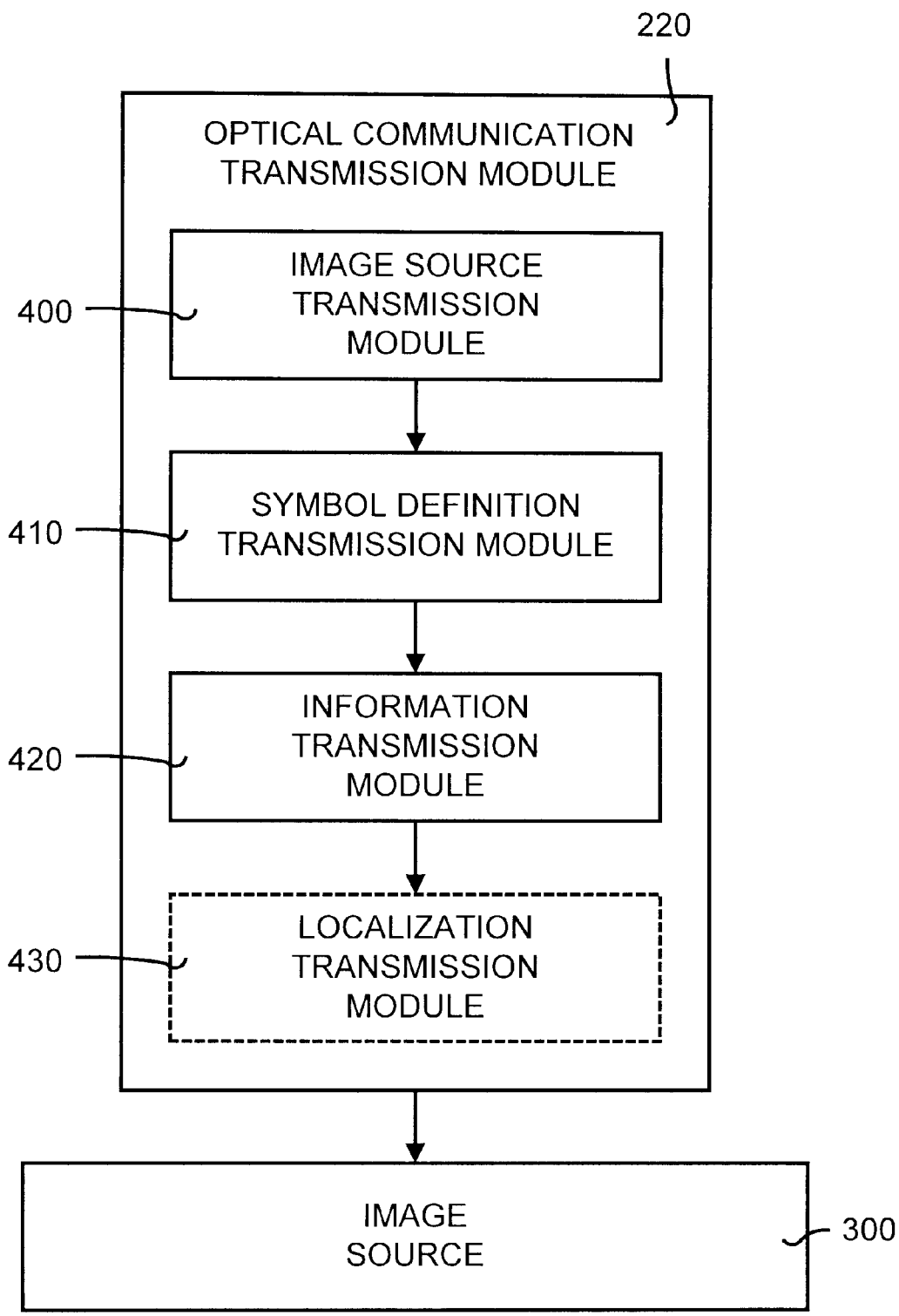
FIG. 4 is a block diagram illustrating the optical communication transmission module of FIG. 3.

FIG. 4 is a block diagram illustrating the optical communication transmission module 220 of FIG. 3. In general, the optical communication transmission module 220 resides in an image source environment and controls the transmission of information on the image source 300. The optical communication transmission module 220 includes an image source transmission module 400, a symbol definition transmission module 410, an information transmission module 420 and a localization transmission module 430. The image source transmission module 400 instructs the image source 300 to display an attention signal whenever the image source 300 is ready to transmit information. This attention signal is recognized by the image detector 320 as a signal that the image source 300 will begin transmitting information.

The symbol definition transmission module 410 controls the transmission of communication symbols by the image source 300. By way of example, the communication symbols include, for example, a sequence of patterns or images that serves as an alphabet for transmitting information. In a preferred embodiment, all of the communication symbols are transmitted rather than using previously agreed upon communication symbols that are known to both the image source 300 and the image detector 320. This simplifies the communication symbols because it is unnecessary to transform the communication symbols into a proper scale, skew and perspective projection of the image source 300 as seen by the image detector 320.

The information transmission module 420 instructs the image source 300 to transmit information or data to the image detector 320 using the defined communication symbols. The localization transmission module 430 controls the image source 300 in the transmission of a localization pattern. The localization pattern allows the image detector 320 to compute the spatial location (or pose) of the image source 300 relative to the image detector 320. Determining the pose of the display is an optional process (as shown by the dashed lines of the localization transmission module 430 and may used with a stereo camera or a monocular camera.

Figure 5:
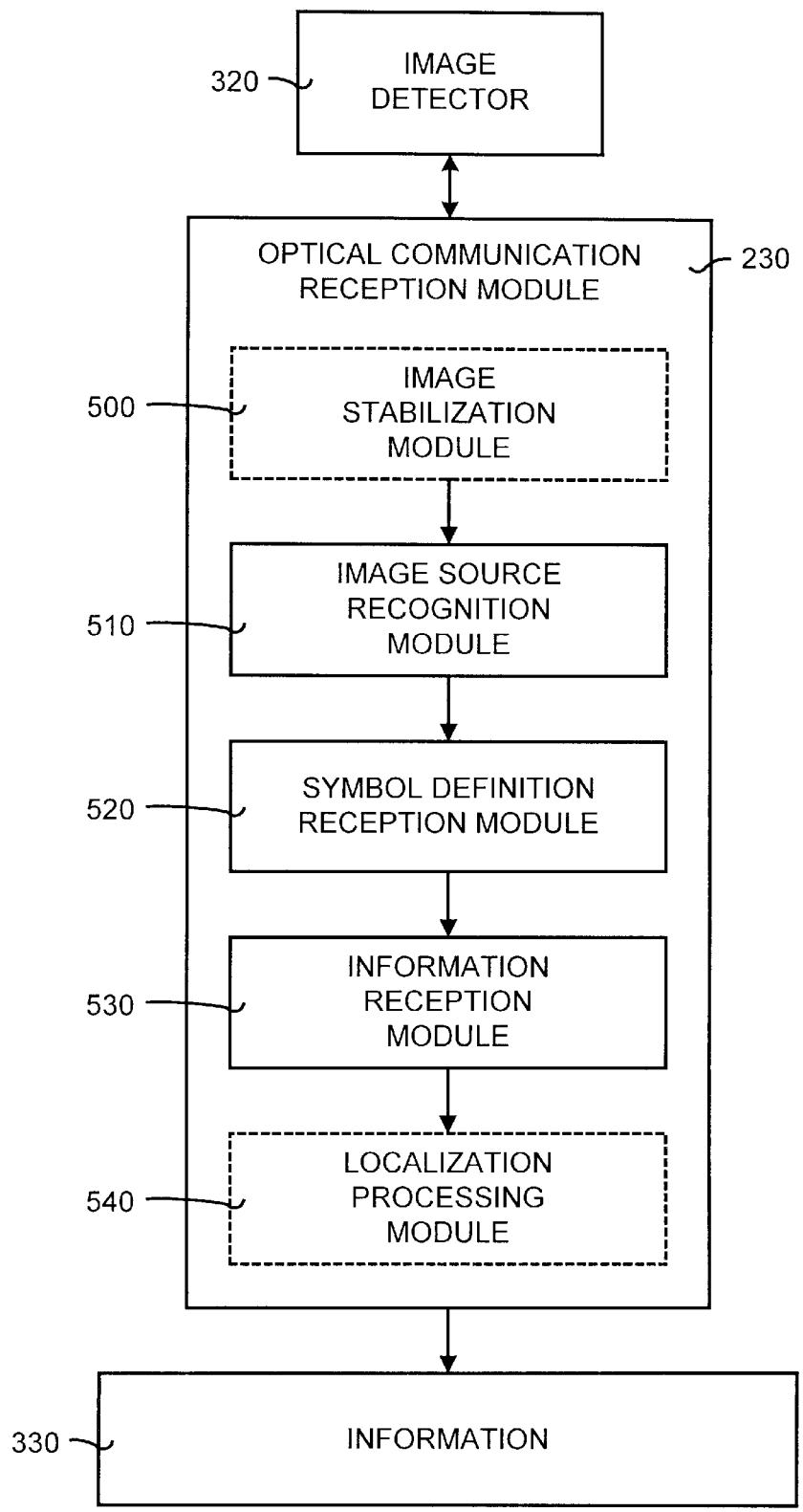
FIG. 5 is a block diagram illustrating the optical communication reception module of FIG. 3.

FIG. 5 is a block diagram illustrating the optical communication reception module 230 of FIG. 3. Generally, the optical communication reception module 230 resides in an image detector environment and controls the reception and interpretation of information received by the image detector 320. The optical communication reception module 230 includes an image stabilization module 500, an image source recognition module 510, a symbol definition reception module 520, an information reception module 530 and a localization processing module 540.

The image stabilization module 500 is an optional process (as depicted by the dashed lines of box 500) that utilizes an aggregation technique to reduce image flicker. This image stabilization is usually needed whenever the image source 300 is a CRT device. This aggregation technique is described in detail below. The image source recognition module 510 is used by the image detector 320 to recognize an attention signal when displayed by the image source 300. This attention signal notifies the image detector 320 that the image source 300 will be transmitting information.

The symbol definition reception module 520 receives and defines the communication symbols as transmitted by the image source 300. In a preferred embodiment, the optical communication reception module 230 does not have prior knowledge of the communication symbols. Thus, the image source 300 transmits all of the communication symbols in sequence so that the image detector can receive the symbols and the symbol definition reception module 520 can assign a meaning to each of the communication symbols.

The information reception module 530 receives information transmitted by the image source 300 and interprets the information based on the previously defined communication symbols. The localization processing module 540 is an optional process (as shown by the dashed lines of box 540) that receives the localization pattern displayed by the image source 300 and determines the spatial location of the image source 300. This localization technique utilizes techniques known in the art to determine the depth of all pixels contained in the localization pattern and use this information to compute the 3 D location of each of those pixels. It should be noted that this localization technique may be used with both a stereo camera and a monocular camera.

V. General Operation of the Invention

Figure 6:
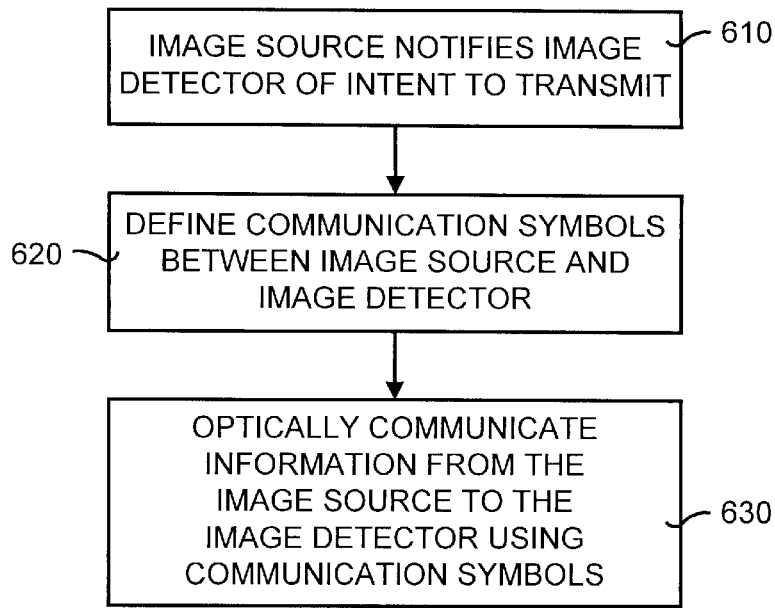
FIG. 6 is a general flow diagram of an optical communication method of the present invention.

FIG. 6 is a general flow diagram of an optical communication method of the present invention. Generally, the optical communication method permits the image source 300 (such as a display) to automatically (and without any human intervention) communicate information to the image detector 320 (such as a camera) that is observing the image source 300. This information may be used by the present invention, for example, to establish another type of communication (such as network communication) between the image source 300 and image detector 320 or other device. The present invention also allows a spatial location of the image source 300 to be determined by having the image source 300 display a localization pattern to the image detector 320.

In particular, the optical communication process of the present invention includes having the image source 300 notify the image detector 320 that the image source 300 intends to transmit (box 610). In other words, the image source 300 gets the image detector 320 to recognize the image source 300. This is preferably accomplished by having the image source 300 display an attention signal. The attention signal is recognized by the image detector 320 as an indication that the image source 300 will begin transmission.

Next, communication symbols are defined between the image source 300 and the image detector 320 (box 620). This is preferred to the alternative of having the communication symbols known beforehand to both the image source 300 and the image detector 320. By defining all of the communication symbols, the problem of scale and perspective relating to different image sources is alleviated. Communication symbols are transmitted by the image source 300 in sequence and received by the image detector 320. As explained in the working example below, the image detector 320 receives each one of the communication symbols and defines the symbols. Preferably, the communication symbols are displayed sufficiently slowly such that the image detector 320 can obtain a stable image of each one of the communication symbols.

Information (or data) that is to be sent by the image source 300 is optically communicated from the image source 300 to the image detector 320 using the communication symbols (box 630). Many types of information may be transmitted, including, for example, a network address of the image source 300 or image detector 320. As discussed in reference to FIGS. 2A and 2B, this would allow a display or camera to be integrated into a computer network of which the display or camera has knowledge.

Figure 7:
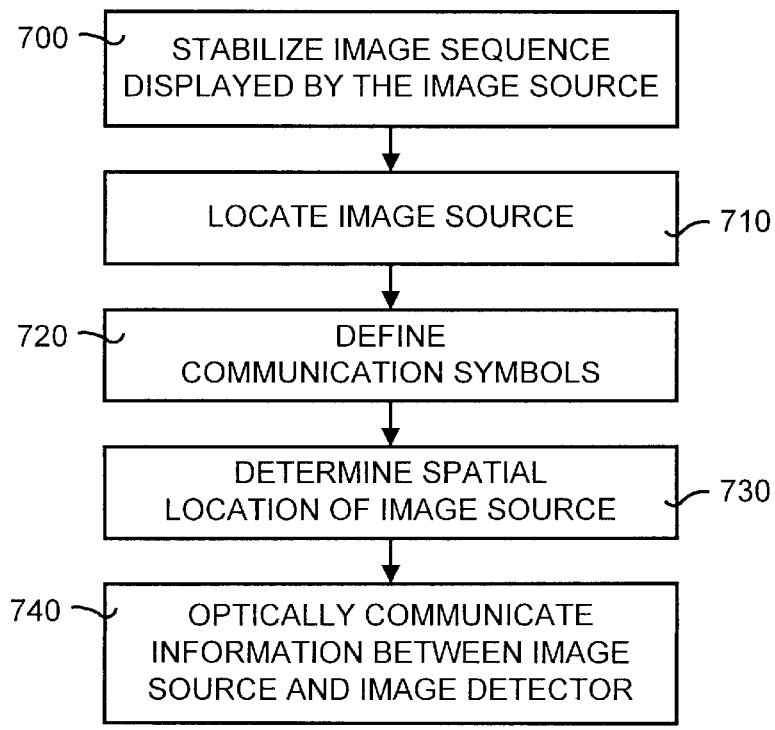
FIG. 7 is a general flow diagram illustrating a preferred embodiment of the optical communication method shown in FIG. 6.

FIG. 7 is a general flow diagram illustrating a preferred embodiment of the optical communication method shown in FIG. 6. This preferred embodiment includes stabilizing the image sequence 310 displayed on the image source 300 as seen by the image detector 320 (box 700). Although this stabilization works on most types of image sources (such as liquid crystal displays (LCD) and plasma screens), this stabilization technique is primarily used for CRT devices. Image sequences from CRT devices are not clear because of flicker, which is caused by the manner in which the tube is refreshed. The stabilization technique of the present invention uses an aggregation technique to stabilize the image sequence and alleviate any flicker. In particular, the maximum of each color component (red, green and blue) for each pixel over the image sequence produces a stabilized aggregated image.

This preferred embodiment also includes locating the image source 300 (box 710). Locating the image source 300 includes both alerting the image detector 320 that the image source 300 is ready to begin transmission and locating the portion of the image sequence 310 that is occupied by the image source 300. In this preferred embodiment, the image detector 320 continually monitors the aggregated (and stabilized) field of view looking for image sources that are displaying recognizable attention signals. Preferably, the attention signal is a specific sequence of patterns that would not likely occur normally in an environment or unintentionally on the image source 300. As described below in the working example, a preferred attention signal is a complete transition from blue to red of the image source 300.

After this attention signal is displayed by the image source 300, the image detector 320 expects the image source 300 to transmit information. Because it may not be known what as displayed on the image source 300 prior to a blue screen, the attention signal is displayed for a long interval of time (such as, for example, two seconds or more) to allow the image detector 320 to reset. Thus, when the image detector 320 observes the image source 300 transition to red (the attention signal) then the image detector 320 will recognize the image source 300 and recognize that the image source 300 will soon be transmitting information. The attention signal also gives the image detector 320 a good estimate of the region of the image sequence 310 that is occupied by the image source 300. This region is stored in the optical communication reception module 230 and instructs the module 230 whereto look in the image sequence 310 for the information displayed by the image source 300.

After the image source 300 is located and the region of the image sequence 710 occupied by the image source 300 is determined, communication symbols are defined (box 720). In this preferred embodiment, all of the communication symbols are transmitted (rather than having predefined communication symbols known beforehand to both the image source 300 and image detector 320), which, as noted above, simplifies the present invention. Moreover, in this preferred embodiment, the initial red attention signal becomes the first symbol of the communication symbols. Preferred communication symbols are described below in the working example. The image source 300 displays each one of the communication symbols that will be used to transmit information. The image detector 320 receives each symbols element and adds each successive symbol to the communication symbols. Each symbol should be displayed by the image source 300 sufficiently slowly such that the image detector 320 can obtain a stable image of each symbol.

This preferred embodiment also includes using a stereo camera to determine a spatial location (or pose) of the image source 300 relative to the image detector 320 (box 730). This embodiment uses an image detector 320 having two or more cameras in a calibrated stereo vision arrangement. In this preferred embodiment, the depth of image source pixels may be determined utilizing techniques known to those having ordinary skill in the art. Note that only the pixels within the region of the image sequence 310 occupied by the image source 300 are used. In an alternate embodiment of determining the pose of the image source 300, an image detector 320 having a calibrated monocular camera arrangement is used. This embodiment requires that three or more points on the image source 300 be detected by the image detector 320 and that the relative positions on a plane defined by those points be determined in physical or real units (such as inches or centimeters). Using the camera calibration parameters (or intrinsic parameters) the 3 D pose of the image source 300 is determined using standard correlation techniques known to those skilled in the art. It should be noted that using more than three points would improve the display pose estimate. Moreover, the image source 300 could transmit the size of the image source 300 to the image detector 320 so that the image detector 320 would not need to know this information beforehand.

Once the communication symbols have been defined, information may be optically communicated between the image source 300 and the image detector 320 (box 740) using these symbols. In other words, optical communication of information is performed using the communication symbols. An example of a transmission using a preferred set of communication symbols is described below.

VI. Operational Details and Working Example of the Invention

Figure 8A:
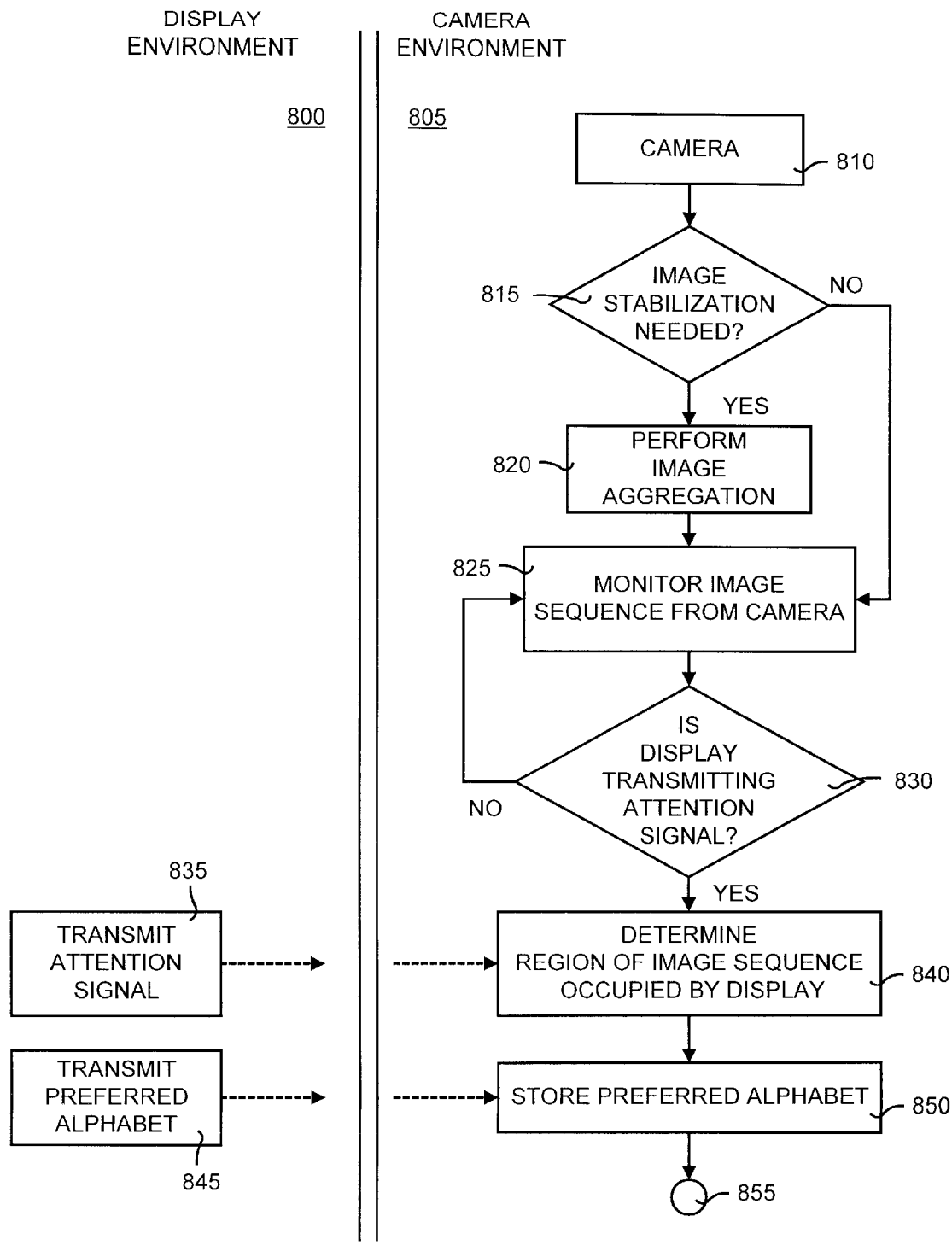
FIGS. 8A and B are detailed flow diagrams illustrating a working example of FIGS. 6 and 7 of the present invention.

FIGS. 8A and B are detailed flow diagrams illustrating a working example of FIGS. 6 and 7 of the present invention. This working example is provided for illustrative purposes and is only one of several ways in which the present invention may be implemented. In this working example, the present invention is used to enable communication between a display and a camera. The present invention as implemented in this working example provided a unidirectional link having a bandwidth of approximately 8 bits per second. This rate can be increased on LCD and plasma screens by changing images faster or, for any screen, the number of communication symbols (or alphabet size) can be increased at the expense of reliability.

Referring to FIG. 8A, the present invention generally operates in a display environment 800, meaning that the invention generally interacts with the display, and in a camera environment 805, meaning that the invention generally interacts with the camera. In this working example, a video camera was used as the image detector and a CRT display was used as the image source.

The camera 810 obtains a sequence of images and the present invention determines whether image stabilization is needed (box 815). In general, image stabilization is needed for CRT displays and, although the image stabilization of the present invention works on other types of displays (such as LCD and plasma displays), is generally not necessary for these types of displays. In this working example, image stabilization was necessary because a CRT display was being used. The present invention performs image aggregation (box 820) and takes the maximum of each red, green and blue color component for each pixel over a series of images. In this working example, five successive images were obtained at 30 frames per second and were sufficient to produce a stabilized image of a CRT display refreshing at a rate of 75 Hz or greater. If the display would have been a LCD or plasma display the image stabilization technique could have been omitted.

The camera 810 monitors an image sequence of a scene containing the display (box 825) while performing image stabilization on the image sequence obtained. The invention continually determines whether the display is transmitting an attention signal (box 830). If the display is not displaying an attention signal the invention continues to monitor the scene (box 825). When the display is ready to transmit, the display transmits an attention signal (box 835) to notify the camera 810 that the display is ready to transmit information. In this working example, the attention signal was a complete transition from a blue screen to a red screen.

The present invention also determines the region of the image sequence that is occupied by the display (box 840), which in this case is displaying a red attention signal. Moreover, in this working example this region of the image sequence occupied by the display is stored by the present invention as a bounding rectangle. Alternatively, other computer vision segmentation techniques known to those having ordinary skill in the art may be used to obtain a more precise pixel model.

Once the display is located, a preferred set of communication symbols, which in this working example is in the form of a preferred alphabet, are transmitted by the display (box 845). The preferred alphabet is transmitted by the display to the camera 800. As discussed above, transmission of the entire alphabet simplifies definition of the alphabet between the display and camera 800. Each element of the preferred alphabet is transmitted by the display, received by the camera 800 and stored by the present invention (box 850).

Figure 9:
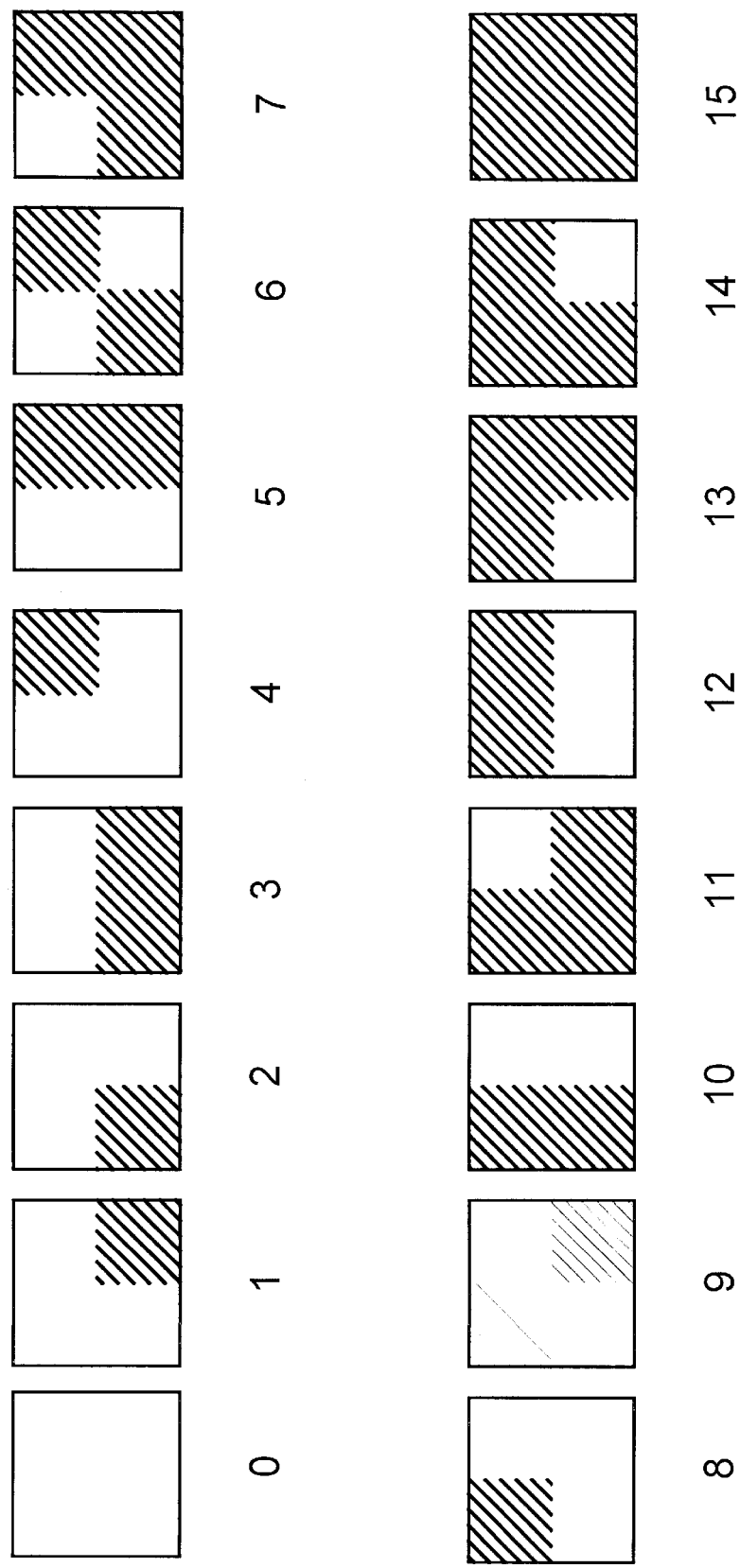
FIG. 9 illustrates a preferred alphabet of the communication symbols used in the working example.

FIG. 9 illustrates the preferred alphabet of the communication symbols used in this working example. In FIG. 9, the shaded area represents a blue display color and the unshaded area represents a red display color. The red rectangle used as the attention signal also is used as the first element of the alphabet. In addition to representing numbers from 0 to 15 as shown in FIG. 9, the preferred alphabet also includes the following special codes associated with some of the numbers.

TABLE 1

| "0" | Escape |
| "1" | Begin Packet |
| "2" | End Packet |
| "3" | Data = 0 |
| "4" | Duplicate |
| "5" | Keep Alive |
| "6" | End Session |
| "7" | End Alphabet |

Referring to Table 1, because "0" (the first element of the alphabet) is used as the escape code, a "Data =0" code is included in order to transmit a data value of "0". In addition, adjacent duplicate pieces of data are not discernable as separate, and therefore the "Duplicate" code is provided. An illustration of the use of some of these codes is provided below. A connector 855 is provided to connect FIG. 8A to FIG. 8B.

Figure 8B:
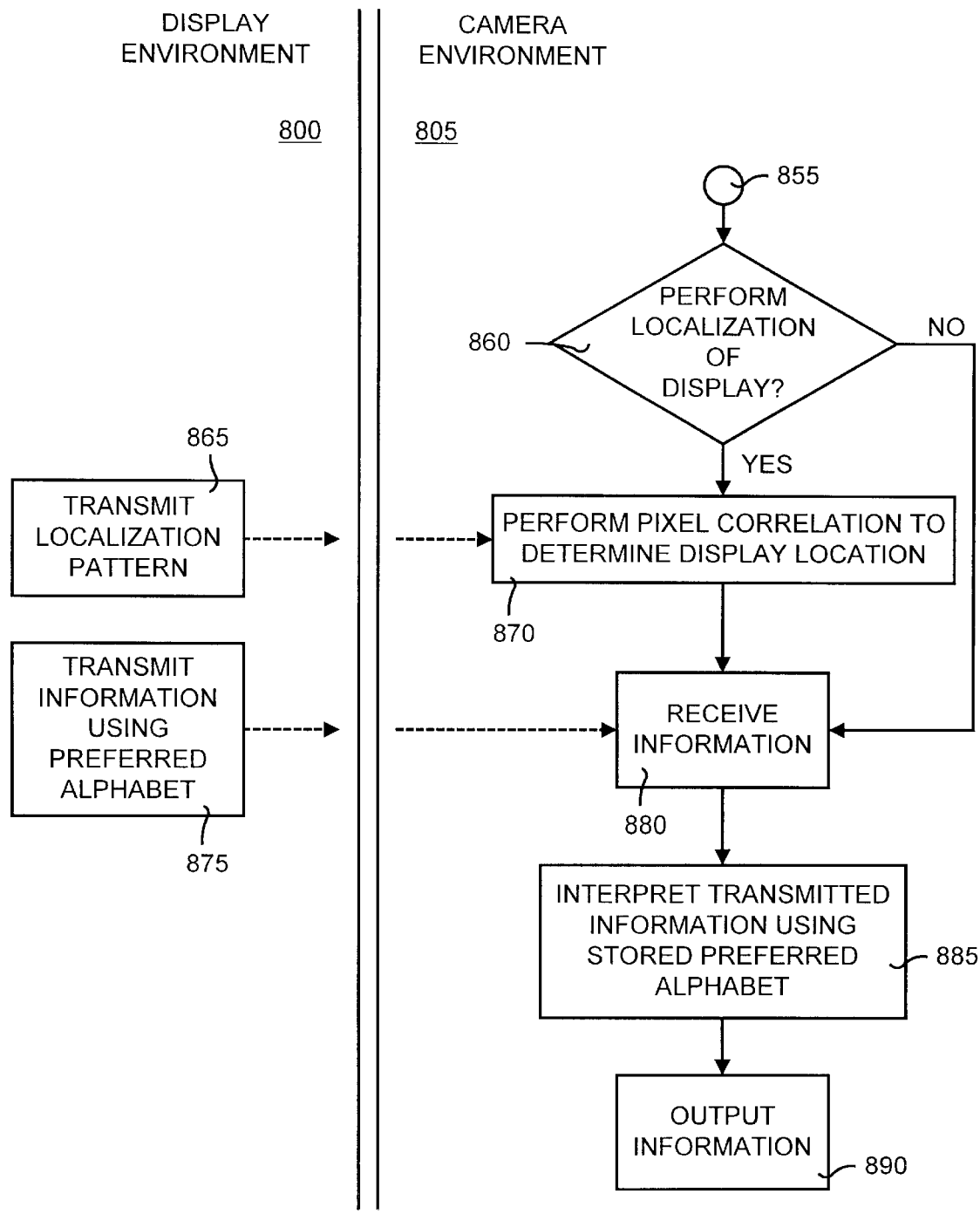

FIG. 8B is a continuation of the working example of FIG. 8A. The present invention determines whether to perform localization of the display (box 860). This is an optional step, which in this working example is performed. In particular, the camera includes a stereo vision system in a calibrated arrangement such that the depth of each pixel is determined. In order to obtain a better depth estimate at each pixel, a localization pattern that includes a special "random" pattern of blocks is displayed and transmitted at a time known by the camera 800 (box 865). Although the localization pattern may be transmitted at any time known to both the display and the camera, in this working example the localization pattern is transmitted at the end of the transmission of the preferred alphabet.

Figure 10:
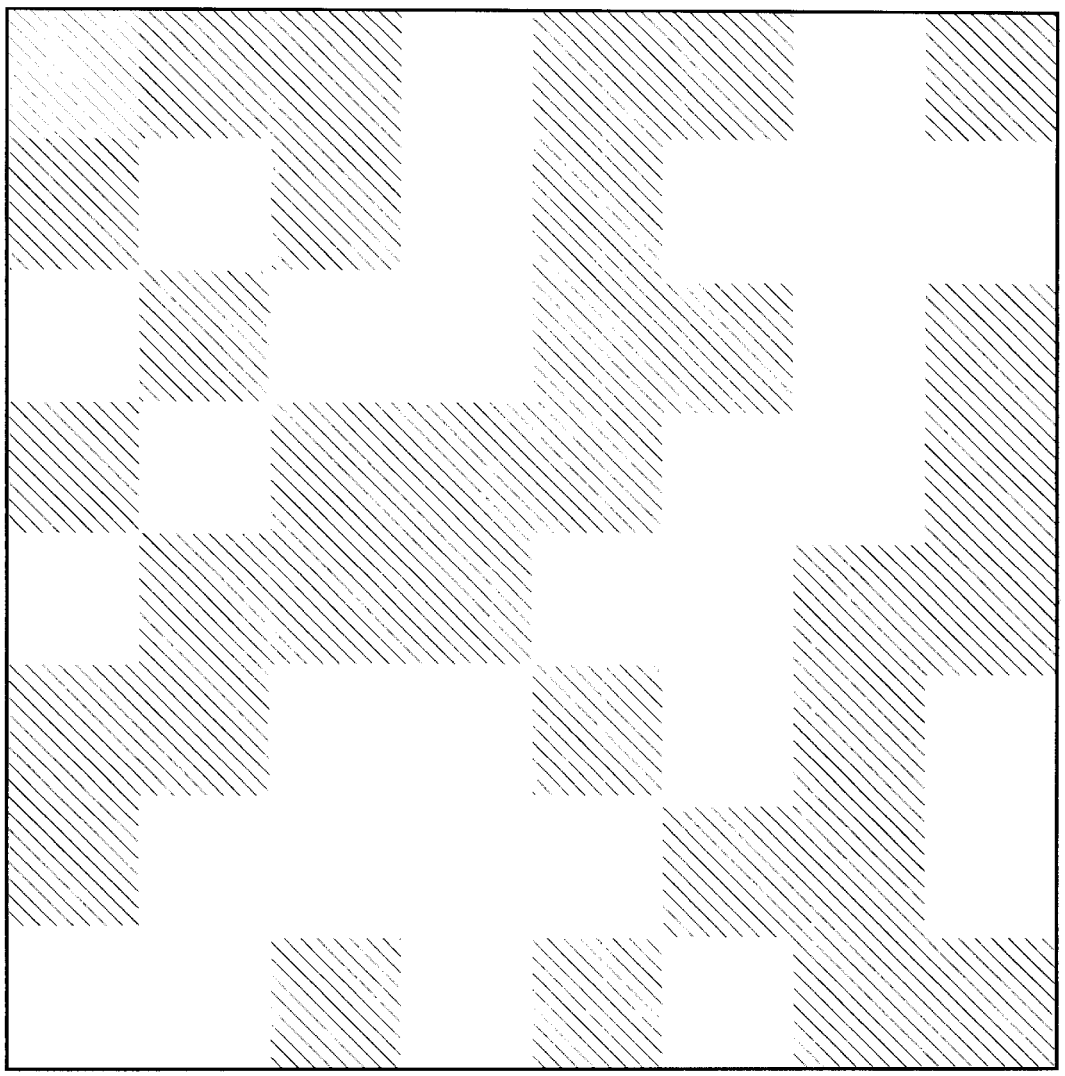
FIG. 10 illustrates a preferred localization pattern used in the working example.

Once the localization pattern is transmitted, pixel correlation for each pixel is performed (box 870). Traditional stereo vision techniques rely on block correlation between images in the image sequence, and using a random pattern for the localization pattern maximizes the likelihood of a strong maximum in the correlation process for each pixel. FIG. 10 illustrates a preferred localization pattern used in the working example. It should be noted that the hatched blocks represent dark areas and the unhatched blocks represent light areas of the display.

In this working example, pixel correlation is performed by converting pixels in screen coordinates (row, column and disparity) to spatial coordinates (x, y, z in meters) such that the spatial location of the display is determined in x,y,z, coordinates. A planar fit is performed by computing the eigenvectors and eigenvalues of the matrix formed by the list of all the x,y,z points. The smallest eigenvalue indicated the eigenvector that is normal to the surface of the display plane. From this information, the spatial location of the display (relative to the camera 800) is determined. It should be noted that other techniques for computing this planar fit (such as a least squared technique or other robust least squares technique) also may be used. In addition, several other correlation techniques may be used to compute the pose of the display.

After the localization of the display is performed, the display transmits information (or data) using the preferred alphabet shown in FIG. 9 and in Table 1 (box 875). The camera 800 receives the information (box 880) and interprets the information using the preferred alphabet that has been previously stored (box 885). This storage of the preferred alphabet occurred when the display transmitted the entire preferred alphabet one element at a time. The information is then sent as output (box 890) to, in this working example, establish a network connection between the display and the camera 800.

Figure 11:
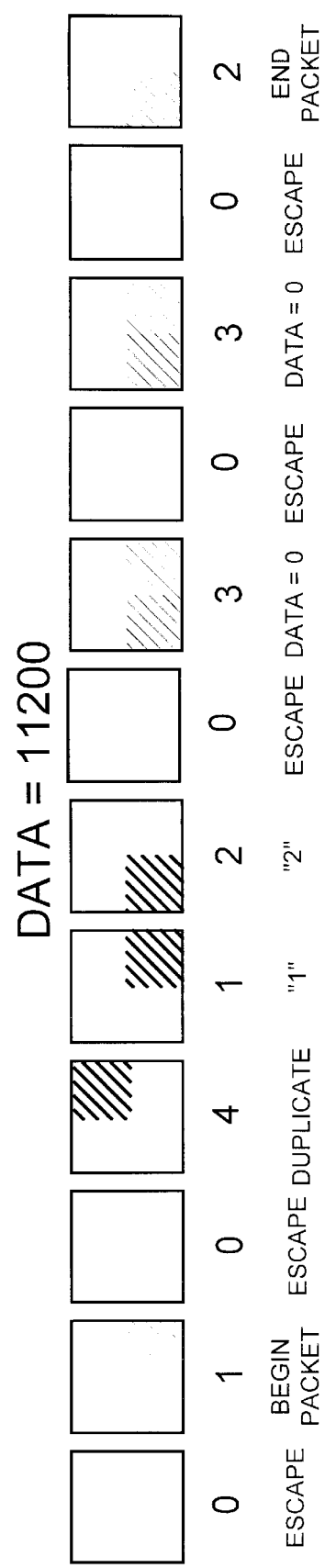
FIG. 11 is an example of an information transmission performed in accordance with the working example.

FIG. 11 is an example of an information transmission performed in the working example. In particular, the data to be transmitted is the sequence of five numbers "11200" as a single packet. It should be noted that the packet length of five is for illustration purposes only and the present invention may be extended to a packet of any length. Referring to FIGS. 9 and 11 as well as Table 1, the number "0" or "Escape" is transmitted first as an alert signal to the camera 800 that the display is about to begin transmitting information. Next, a "1" or "Begin Packet" is transmitted to mark the beginning of the packet. A "0" (or "Escape" code) and a "4" (or "Duplicate" code) followed by a "1" is transmitted to send two "1s" sequentially. A "2" followed by a "Escape" code and a "3" or "Data =0" code is transmitted twice to send two "0s". Finally, a "2" or "End Packet" code is transmitted signaling the end of the packet.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description of the invention, but rather by the claims appended hereto.

What is claimed is:

1. A method for optically communicating information between an image source and an image detector, comprising:
   notifying the image detector through the image source that the image source is prepared to transmit the information;
   defining communication symbols by transmitting each one of the communication symbols from the image source to the image display;
   optically transmitting the information from the image source to the image detector using at least some of the communication symbols; and
   geometrically determining a spatial location of the image source using a localization pattern transmitted by the image source.

2. The method of claim 1 wherein the image detector is a stereo camera and geometrically determining the spatial location of the image source further comprises using a correlation process, and wherein the localization pattern includes a random pattern arranged such that a likelihood of a strong maximum in the correlation process is maximized.

3. The method of claim 1 wherein the image detector is a monocular camera and geometrically determining the spatial location of the image source further comprises detecting at least three points on the image source.

4. The method of claim 3 wherein geometrically determining the spatial location of the image source further comprises determining a relative position on a plane of each of the points.

5. A method for optically communicating information between an image source and an image detector observing the image source and not otherwise in communication with each other, comprising:
   displaying an attention signal on the image source to notify the image detector that the image source is ready to establish an optical communication link;
   defining communication symbols to the image detector by displaying each one of the communication symbols in sequence;
   displaying at least some of the communication symbols previously defined to the image detector so as to represent the information being communicated to the image detector; and
   determining a spatial location of the image source by optically communicating a localization pattern to the image detector and using a correlation process to correlate each pixel in the pattern to the spatial location of the image source.

6. The method of claim 5 wherein the pattern is a random pattern that provides a strong correlation maximum for the correlation process.

7. The method of claim 5 wherein the image detector is one of: (a) a stereo camera arrangement; (b) a monocular camera arrangement.

* * * * *